United States Patent
Takagi et al.

(10) Patent No.: US 7,709,067 B2
(45) Date of Patent: *May 4, 2010

(54) CELLULOSE ESTER FILM, POLARIZING PLATE AND LIQUID CRYSTAL DISPLAY

(75) Inventors: Takahiro Takagi, Sagamihara (JP); Isamu Michihata, Machida (JP); Noriyasu Kuzuhara, Kunitachi (JP); Koichi Saito, Kawagoe (JP); Koji Tasaka, Hachioji (JP); Hiroki Umeda, Hino (JP); Minori Tamagawa, Hino (JP); Shinji Inagaki, Hachioji (JP)

(73) Assignee: Konica Minolta Opto, Inc., Tokyo (JP)

( * ) Notice: Subject to any disclaimer, the term of this patent is extended or adjusted under 35 U.S.C. 154(b) by 143 days.

This patent is subject to a terminal disclaimer.

(21) Appl. No.: 11/415,577

(22) Filed: May 1, 2006

(65) Prior Publication Data

US 2006/0257591 A1    Nov. 16, 2006

(30) Foreign Application Priority Data

May 10, 2005    (JP)    ............................. 2005-137144
Jun. 22, 2005    (JP)    ............................. 2005-181836

(51) Int. Cl.
*G02F 1/1335* (2006.01)

(52) U.S. Cl. .................. 428/1.33; 428/1.54; 106/182.1; 106/186.2; 349/96; 349/117; 349/122

(58) Field of Classification Search ................ 428/1.33, 428/1.54; 106/181.1, 182.1, 184.3, 186.2; 264/191, 200, 207–208, 211; 349/117, 96

See application file for complete search history.

(56) References Cited

U.S. PATENT DOCUMENTS

| 2,689,799 | A  | * | 9/1954  | Albus et al. ............ 106/169.39 |
| 7,550,182 | B2 | * | 6/2009  | Inagaki et al. ............... 428/1.33 |
| 7,635,506 | B2 | * | 12/2009 | Takagi ........................ 428/1.33 |
| 2003/0037703 | A1 | * | 2/2003 | Saito ...................... 106/169.33 |
| 2003/0156235 | A1 | * | 8/2003 | Kuzuhara et al. ............. 349/96 |
| 2003/0170482 | A1 | * | 9/2003 | Murakami .................. 428/615 |
| 2004/0044127 | A1 | * | 3/2004 | Okubo et al. .............. 525/54.3 |

* cited by examiner

*Primary Examiner*—Sophie Hon
(74) *Attorney, Agent, or Firm*—Frishauf, Holtz, Goodman & Chick, P.C.

(57) ABSTRACT

A cellulose ester film comprising a compound represented by Formula (1): Formula (1) B-(G-A)n-G-B, wherein B represents a benzene monocarboxylic acid residue; G represents an alkylene glycol residue having 2-12 carbon atoms, an aryl glycol residue having 6-12 carbon atoms, or an oxyalkylene glycol residue having 4-12 carbon atoms; A represents an alkylene dicarboxylic acid residue having 4-12 carbon atoms or an aryldicarboxylic acid residue having 6-12 carbon atoms; and n represents an integer of 1 or more.

11 Claims, 1 Drawing Sheet

CELLULOSE ESTER FILM, POLARIZING PLATE AND LIQUID CRYSTAL DISPLAY

This application is based on Japanese Patent Application No. 2005-137144 filed on May 10, 2005, and No. 2005-181836 filed on Jun. 22, 2005 in Japanese Patent Office, the entire content of which is hereby incorporated by reference.

FIELD OF THE INVENTION

The present invention relates to a cellulose ester film, polarizing plate and liquid crystal display, and in detail, a cellulose acetate film improved in reversible variation of retardation value depending on the humidity variation and a polarizing plate and a liquid crystal display using the cellulose ester film, which are excellent in anti-light leaking, viewing angle and visibility.

BACKGROUND OF THE INVENTION

Recently, demand on thinning layer, larger sizing and higher performance for the polarizing plate protecting film to be used in a display such as a liquid crystal display rise accompanied with development of thin and light note type personal computers and large screen televisions. In such the situation, the narrow viewing angle has considered hitherto as a problem. For making a wider viewing angle, it is proposed to provide a function of optical compensation sheet to the protecting film, (for example, refer to Japanese Patent Publication Open to Public Inspection (hereafter referred to as JP-A) No. 6-222213).

Moreover, a technique of addition of a crosslinking agent into the protective film for preventing tear of the polarizing plate is proposed (for example, refer to JP-A No. 2001-55402). The yield of the polarizing plate can be raised by such the technique.

Furthermore, an addition of a rod-shaped compound to the protective film is proposed for solving a problem of variation of the displayed image such as the contrast, tone and gradation, particularly variation in tone, depending on the viewing angle (for example, refer to JP-A Nos. 2002-267847 and 2004-4550).

The variation of the displayed image in the contrast, tone and gradation depending on the variation of viewing angle and the occurrence of tear of the polarizing plate can be improved by the above-described means but the effects of them have not been fully sufficient. Furthermore, a problem is posed that the retardation value of the protective film used in the usual polarizing plate is reversely varied accompanied with variation of the humidity. Such the phenomenon relates to variation in the quality of displayed image on the liquid crystal display. Therefore, a technical means for dissolving such the problem has been desired.

Furthermore, it has been found that the light leaking caused by thermal distortion cannot be completely prevented when the polarizing plate using an optical compensation sheet is installed as the protecting film on a large size panel of not less than 17 inches. It is necessary that the optical compensation sheet not only has the function of optically compensating the liquid crystal cell but also has excellent durability against variation of the environmental condition.

SUMMARY OF THE INVENTION

An object of the present invention is to provide a cellulose ester film having an improved reversible variation of retardation value due to variation of humidity and to provide a polarizing plate and a liquid crystal display having improved anti-light leaking, viewing angle and visibility using the cellulose ester film The above object of the present invention is achieved by the following structures.

(1) A cellulose ester film comprising a compound represented by Formula (1)

Formula (1)

wherein B represents a benzene monocarboxylic acid residue; G represents an alkylene glycol residue having 2-12 carbon atoms, an aryl glycol residue having 6-12 carbon atoms, or an oxyalkylene glycol residue having 4-12 carbon atoms; A represents an alkylene dicarboxylic acid residue having 4-12 carbon atoms or an aryldicarboxylic acid residue having 6-12 carbon atoms; and n represents an integer of 1 or more.

(2) The cellulose ester film of Item (1), wherein a molecular weight of the compound represented by Formula (1) is 300-2000.

(3) The cellulose ester film of Item (1) or (2), wherein the cellulose ester film further comprises a polyalcohol ester.

(4) The cellulose ester film of any one of Items (1) to (3), wherein the cellulose ester film simultaneously satisfies the following formulae (I) and (II):

$$2.1 \leq X+Y \leq 2.9 \qquad (I)$$

$$1.0 \leq X \leq 2.9 \qquad (II)$$

wherein X represents an acetyl substitution degree and Y represents a fatty acid ester group substitution degree.

(5) The cellulose ester film of any one of Items (1) to (4), wherein the cellulose ester film has a width of 1.4-4 m.

(6) The cellulose ester film of any one of Items (1) to (5), wherein Ro represented by the following equation is 20-300 nm under a condition of 23° C. and 55% RH, and Rt represented by the following equation is 70-400 nm under the condition of 23° C. and 55% RH:

$$Ro=(nx-ny) \times d$$

$$Rt=((nx+ny)/2-nz) \times d$$

wherein nx, ny and nz represent refractive indexes in x, y, and z directions, respectively, x, y, and z representing three principal axes of a refractive index ellipsoid; nx and ny each represent an in-plane refractive index, while nx≧ny; nz represents a refractive index in a thickness direction; and d represents a thickness (nm) of the cellulose ester film.

(7) A polarizing plate having the cellulose ester film of any one of Items (1) to (6) provided on one surface of a polarizer.

(8) The polarizing plate of Item (7), wherein the cellulose ester film is provided on one surface of the polarizer as a polarizing plate protective film.

(9) The polarizing plate of Item (7), wherein the cellulose ester film is provided on one surface of the polarizer as a retardation film.

(10) The polarizing plate of any one of Items (7) to (9), wherein Ro of the cellulose ester film represented by the following equation is 20-300 nm under a condition of 23° C. and 55% RH, and Rt of the cellulose ester film represented by the following equation is 70-400 nm under the condition of 23° C. and 55% RH:

$$Ro=(nx-ny) \times d$$

$$Rt=((nx+ny)/2-nz) \times d$$

wherein nx, ny and nz represent refractive indexes in x, y, and z directions, respectively, x, y, and z representing three principal axes of a refractive index ellipsoid; nx and ny each represent an in-plane refractive index, while nx ≧ ny; nz represents a refractive index in a thickness direction; and d represents a thickness (nm) of the cellulose ester film.

(11) A liquid crystal display employing the polarizing plate of any one of Items (7) to (10).

DESCRIPTION OF THE PREFERRED EMBODIMENTS

The best modes of the present invention will now be described in detail, however, the present invention is not limited thereto.

The present invention will be detailed below.

The cellulose ester film of the present invention is characterized in that an aromatic terminal ester compound represented by Formula (1) (hereinafter merely referred to as an aromatic terminal ester compound) is incorporated.

B-(G-A)n-G-B                                Formula (1)

wherein B represents a benzene monocarboxylic acid residue; G represents an alkylene glycol residue having 2-12 carbon atoms, an aryl glycol residue having 6-12 carbon atoms, or an oxyalkylene glycol residue having 4-12 carbon atoms; A represents an alkylene dicarboxylic acid residue having 4-12 carbon atoms or an aryldicarboxylic acid residue having 6-12 carbon atoms; and n represents an integer of at least 1.

In Formula (1), constitution is performed employing the benzene monocarboxylic acid residue represented by B, the alkylene glycol residue, the oxyalkylene glycol residue, or the aryl glycol residue represented by G, and the alkylene dicarboxylic acid residue or the aryl dicarboxylic acid reside represented by A, and preparation is performed employing the same reactions as for common polyester based plasticizers.

Examples of a benzene monocarboxylic acid component of the aromatic terminal ester plasticizer of the present invention include: benzoic acid, p-tert-butyl benzoic acid, o-toluic acid, m-toluic acid, p-toluic acid, dimethyl benzoic acid, ethyl benzoic acid, n-propyl benzoic acid, aminobenzoic acid and acetoxy benzoic acid, which may be used alone or in combination of two or more acids.

Examples of an alkylene glycol component having 2-12 carbon atoms of the aromatic terminal ester plasticizer of the present invention include: ethylene glycol, 1,2-propylene glycol, 1,3-propylene glycol, 1,2-butanediol, 1,3-butanediol, 2-methyl-1,3-propanediol, 1,4-butanediol, 1,5-pentanediol, 2,2-dimethyl-1,3-propanediol (also known as neopentylglycol), 2,2-diethyl-1,3-propanediol (also known as 3,3-dimethylol pentane), 2-n-butyl-2-ethyl-1,3-propanediol (also known as 3,3-dimethylol heptane), 3-methyl-1,5-pentanediol-1,6-hexanediol, 2,2,4-trimethyl-1,3-pentanediol, 2-ethyl-1,3-hexanediol, 2-methyl-1,8-octanediol, 1,9-nonanediol, 1,10-decanediol, 1,12-octadecanediol, which may be used alone or in combination of two or more glycols.

Examples of an oxyalkylene glycol component having 4-12 carbon atoms of the aromatic terminal ester of the present invention include: diethylene glycol, triethylene glycol, tetraethylene glycol, dipropylene glycol and tripropylene glycol, which may be used alone or in combination of two or more glycols.

Examples of an aryl glycol component having 6-12 carbon atoms of the aromatic terminal ester of the present invention include: hydroquinone, resorcin, bisphenol A, bisphenol F and bisphenol, which may be used alone or in combination of two or more.

Examples of an alkylene dicarboxylic acid component having 4-12 carbon atoms of the aromatic terminal ester of the present invention include: succinic acid, maleic acid, the fumaric acid, glutaric acid, adipic acid, azelaic acid, sebacic acid and dodecane dicarboxylic acid, which may be used alone or in combination of two or more acids. Examples of an aryl dicarboxylic acid component having 6-12 carbon atoms of the aromatic terminal ester of the present invention include: phthalic acid, isophthalic acid, terephthalic acid, 1,5-naphthalene dicarboxylic acid and 1,4-naphthalene dicarboxylic acid.

The number average molecular weight of the aromatic terminal ester plasticizer used in the present invention is preferably 300-2000, and more preferably 500-1500. The acid value of the aromatic terminal ester plasticizer used in the present invention is preferably not more than 0.5 mgKOH/g and more preferably not more than 0.3 mgKOH/g. The hydroxyl value of the aromatic terminal ester plasticizer used in the present invention is preferably not more than 25 mgKOH/g and more preferably not more than 15 mgKOH/g.

(Acid Value and Hydroxyl Value of Aromatic Terminal Ester)

"Acid value" means the milligrams of potassium hydroxide required to neutralize the acid (carboxyl group existing in a specimen) included in 1 g of sample. The acid value and the hydroxyl value are measured based on JIS K0070.

Examples of a synthetic method of an aromatic terminal ester plasticizer are shown below:

<Sample No. 1 (Aromatic Terminal Ester Sample)>

In a container, 820 weight parts (5 moles) of phthalic acid, 608 weight parts (8 moles) of 1,2-propylene glycol, 610 weight parts (5 moles) of benzoic acid and 0.30 weight part of tetra-isopropyl titanate (as a catalyst) were loaded at a time, and, while stirring under a nitrogen atmosphere, the mixture was heated at 130-250° C. until the acid value decreased to 2 or less. The excess monohydric alcohol was refluxed using a reflux condenser and produced water was continuously removed. Then, the container was evacuated to $6.65 \times 10^3$ Pa and, finally, to $4 \times 10^2$ Pa at 200-230° C., while the distillate was removed. The product was filtered to obtain an aromatic terminal ester having the following features. The obtained aromatic terminal ester was found to have the structure of the following exemplified compound (1).

| | |
|---|---|
| Viscosity (25° C.): | 19815 mPa · s |
| Acid value: | 0.4 |

<Sample No. 2 (Aromatic Terminal Ester Sample)>

An aromatic terminal ester having the following features was prepared in the same manner as Sample No. 1 except that 500 weight parts (3.5 moles) of adipic acid, 305 weight parts (2.5 moles) of benzoic acid, 583 weight parts (5.5 moles) of diethylene glycol and 0.45 weight part of tetra-isopropyl titanate (as a catalyst) were used. The obtained aromatic terminal ester was found to have the structure of the following exemplified compound (2).

| Viscosity (25° C.): | 90 mPa · s |
|---|---|
| Acid value: | 0.05 |

<Sample No. 3 (Aromatic Terminal Ester Sample)>

An aromatic terminal ester having the following features was prepared in the same manner as Sample No. 1 except that 570 weight parts (3.5 moles) of isophthalic acid, 305 weight parts (2.5 moles) of benzoic acid, 737 weight parts (5.5 moles) of dipropylene glycol and 0.40 weight part of tetra-isopropyl titanate (as a catalyst) were used. The obtained aromatic terminal ester was found to have the structure of the following exemplified compound (3).

| Viscosity (25° C.): | 33400 mPa · s |
|---|---|
| Acid value: | 0.2 |

Specific examples of an aromatic terminal ester plasticizer of the present invention will be shown below, however, the present invention is not limited thereto.

Mw: 696 (1)

Mw: 746 (2)

Mw: 830 (3)

Mw: 886 (4)    Mw: 462 (5)

Mw: 874 (6)

Mw: 1258 (7)

-continued

Mw: 1494

Mw: 1394

Mw: 852

Mw: 1314

Mw: 1726

Mw: 696

The content of the aromatic terminal ester of the present invention is preferably 1-20% by weight and more preferably 3-11% by weight based on the weight of the cellulose ester film.

In the present invention, it is preferable that a polyalcohol ester plasticizer is further contained in the cellulose ester film.

The polyalcohol ester used in the present invention contains an ester of an aliphatic polyalcohol of divalent or more and a monocarboxylic acid, and preferably has an aromatic ring or a cycloalkyl ring in the molecule.

The polyalcohol utilized in the above polyalcohol ester is represented by the following Formula (2).

$$R1\text{-}(OH)_n \quad \text{Formula (2)}$$

in Formula (2), R1 represents an n-valent organic acid, n represents an integer of 2 or more, OH represents an alcoholic or a phenolic hydroxyl group.

Examples of preferable polyalcohol include: adonitol, arabitol, ethylene glycol, diethylene glycol, triethylene glycol, tetraethylene glycol, 1,2-propanediol, 1,3-propanediol, dipropylene glycol, tripropylene glycol, 1,2-butanediol, 1,3-butanediol, 1.4-butanediol, dibutylene glycol, 1,2,4-butanetriol, 1,5-pentanediol, 1,6-hexanediol, hexanetriol, galactitol, mannitol, 3-methylpentane-1,3,5-triol, pinacol, sorbitol, trimethylolpropane, trimethylolethane and xylitol, but the invention is not limited thereto. Specifically, triethylene glycol, tetraethylene glycol, dipropylene glycol, tripropylene glycol, sorbitol, trimethylol propane and xylitol are preferable.

As the monocarboxylic acid to be used in the polyalcohol ester, a known aliphatic monocarboxylic acid, alicyclic monocarboxylic acid and aromatic monocarboxylic acid may be employed, though the monocarboxylic acid is not specifically limited. Specifically, aliphatic monocarboxylic acid and aromatic monocarboxylic acid are preferable, because the moisture permeability and the volatility are reduced. Examples of the preferable monocarboxylic acid are listed below but the present invention is not limited thereto.

As an aliphatic monocarboxylic acid, a straight or branched chain carboxylic acid having 1 to 32 carbon atoms is preferably employed. The number of carbon atoms is more preferably 1-20, and specifically preferably 1-10. The addition of acetic acid is preferable for raising the compatibility with a cellulose ester, and the mixing of acetic acid with other carboxylic acid is also preferable.

As the preferable aliphatic monocarboxylic acid, saturated fatty acids such as acetic acid, propionic acid, butyric acid, valeric acid, caproic acid, enantic acid, caprylic acid, pelargonic acid, capric acid, 2-ethyl-hexane acid, undecylic acid, lauric acid, tridecylic acid, myristic acid, pentadecylic acid, palmitic acid, heptadecylic acid, stearic acid, nonadecanic acid, arachic acid, behenic acid, lignocelic acid, cerotic acid, heptacosanic acid, montanic acid, melisic acid and lacceric acid; and unsaturated fatty acids such as undecylenic acid, oleic acid, sorbic acid, linolic acid, linolenic acid and arachidonic acid can be exemplified. Examples of preferable alicyclic carboxylic acid include cyclopentane carboxylic acid, cyclohexane carboxylic acid, cyclooctane carboxylic acid and derivatives thereof. Examples of preferable aromatic carboxylic acid include ones formed by introducing an alkyl group into the benzene ring of benzoic acid such as benzoic acid and toluic acid, an aromatic monocarboxylic acid having two or more benzene rings such as biphenylcarboxylic acid, naphthalene carboxylic acid and tetralin carboxylic acid and derivatives of them, and benzoic acid is specifically preferable.

The molecular weight of the polyalcohol is preferably from 300 to 1,500, and more preferably from 350 to 750 though the molecular weight is not specifically limited. Larger molecular weight is preferable since it is less volatile, while smaller molecular weight is preferable for reducing moisture permeability and for obtaining good compatibility with cellulose ester. The carboxylic acid to be employed in the polyalcohol ester may be one kind or a mixture of two or more kinds of them. All of the OH group of the polyalcohol may be esterified, or a part of them may be left as OH groups. Concrete examples of the polyalcohol ester are listed below. The content of the above polyalcohol related compounds is preferably 0-15% by weight and more preferably 3-10% by weight based on the weight of the cellulose ester film.

29

30

31

32

33

34

35

The cellulose ester film of the present invention preferably further contains a plasticizer other than the above mentioned aromatic terminal ester or polyalcohol ester.

Further incorporation of a plasticizer other than the above mentioned aromatic terminal ester or polyalcohol ester results in reducing the solving out of the above mentioned compounds or the plasticizer from the cellulose ester film. The reason is not fully clear, however, it would be because the adding amount of plasticizer per one kind can be decreased; and an interaction between the two plasticizers or between a plasticizer and cellulose ester may have suppressed the solving out of plasticized from the cellulose ester film.

As plasticizers employable in the present invention, the following compounds may be exemplified, however, the present invention is not limited thereto.

Examples of a phosphate ester plasticizer include: triphenyl phosphate, tricresyl phosphate, cresyldiphenyl phosphate, octyldiphenyl phosphate, diphenylbiphenyl phosphate, trioctyl phosphate and tributyl phosphate. Examples of a phthalate ester plasticizer include: diethyl phthalate, dimethoxyethyl phthalate, dimethyl phthalate, dioctyl phthalate, dibutyl phthalate and di-2-ethylhexyl phthalate.

These plasticizers may be used alone or may be used in combination of two or more kinds. The total content of the above mentioned aromatic terminal ester, polyalcohol ester and the plasticizer is preferably 4-21% by weight, more preferably 6-16% by weight and specifically preferably 7-11% by weight, based on the weight of the cellulose ester. When the content is too large, the film becomes too soft and the elasticity decreases when heated, while, when the content is too small, the moisture permeability of the film becomes large.

The cellulose ester used in the present invention is preferably a lower fatty acid ester of cellulose, wherein the lower fatty acid represents a fatty acid having 6 carbon atoms or less. Examples of a specific lower fatty acid ester of cellulose include: cellulose acetate, cellulose propionate, cellulose butyrate, and mixed fatty acid esters such as cellulose acetate propionate and cellulose acetate butylate, for example, disclosed in JP-A No. 10-45804, No. 8-231761 and U.S. Pat. No. 2,319,052. Of these, cellulose triacetate and cellulose acetate propionate are specifically preferable as the lower fatty acid ester of cellulose. These cellulose esters may be used alone or may be used in combination.

The average acetylation degree (the average amount of combined acetic acid) of celuulose triacetate is preferably 54.0-62.5% and more preferably 58.0-62.5%.

As a preferably employable cellulose ester, included are, for example, those having an acyl group with 2-4 carbon atoms as a substituent and simultaneously satisfy Formulas (I) and (II), provided that X represents an acetyl substitution degree and Y represents a propionyl substitution degree:

$2.1 \leq X+Y \leq 2.9$      Formula (I)

$1.0 \leq X \leq 2.9$      Formula (II)

wherein X represents an acetyl substitution degree and Y represents a fatty acid ester group substitution degree. More preferably Formulas (I)' and (II)' are simultaneously satisfied:

$$2.4 \leq X+Y \leq 2.9 \qquad \text{Formula (I)'}$$

$$1.0 \leq X \leq 2.5 \qquad \text{Formula (II)'}$$

Of these, preferable are cellulose acetate propionate having X and Y values satisfying $1.0 \leq X \leq 2.0$ and $0.5 \leq Y \leq 1.3$. The portion which is not substituted with an acyl group generally exists as a hydroxyl group. These compound are prepared by a known method in the art. The acyl substitution degree of a cellulose ester is determined according to the method specified in ASTM-D817-96.

Cellulose ester is prepared using cotton linter, wood pulp or kenaf as a starting material. The cellulose esters prepared from these materials can be used alone or in combination. It is specifically preferable to use a cellulose ester prepared from cotton linter (hereafter merely referred to as linter) alone or in combination.

The ratio of (weight average molecular weight: Mw)/(number average molecular weight: Mn) of the cellulose ester used for the present invention is preferably 1.4-3.0, and more preferably 1.4-2.5. By adjusting the Mw/Mn value in the above range, a larger retardation difference can be obtained by stretching and white turbidity occurring while stretching is reduced.

The average molecular weight and the molecular weight distribution of cellulose ester can be measured by a well-known method using high performance liquid chromatography. A number average molecular weight and weight-average molecular weight can be calculated using these values, and the ratio (Mw/Mn) can also be calculated.

The number average molecular weight (Mn) of the cellulose ester used for the present invention is preferably 30000-200000 and more preferably 40000-170000. A larger molecular weight of a cellulose ester is effective for decreasing variation of a retardation value due to moisture, however, too large molecular weight results in too high viscosity of the dissolved solution of cellulose ester, and the productivity of the cellulose ester film is reduced.

The measurement condition of number average molecular weight and weight average molecular weight using high performance liquid chromatography is as follows.

Solvent: Methylene chloride
Column: Shodex K806, K805, K803G (produced by Showa Denko K.K.)
Column temperature: 25° C.
Sample concentration: 0.1% by weight
Detector: RI Model 504 (produced by GL Sciences Inc.)
Pump: L6000 (produced by Hitachi, Ltd.)
Feed rate: 1.0 ml/min
Calibration: Standardized polystyrene STK standard Polystyrene (made by TOSOH CORP.). A calibration curve is drawn by using 13 samples in the range of Mw=1,000,000-500. The intervals in Mw values among the 13 samples are preferably equal.

The preparation process of the cellulose ester film of the present invention will now be explained.

The preparation process of the cellulose ester film includes: a dope solution preparing process in which cellulose ester and an additive (or additives) are dissolved in a solvent; a casting process in which the dope is cast on a support; and a drying process in which the cast dope is dried.

In the dope preparation process, a higher content of cellulose ester in the dope is preferable since the energy for drying after the casting process is reduced, however, a too high content may result in loss of filtration accuracy due to increase of filtration load. Preferable content of cellulose ester is 10-50% by weight and more preferably from 15-35% by weight, in order to simultaneously satisfy both conditions.

A solvent may be used alone, however, a mixture of a good solvent and a poor solvent is more preferably used to increase manufacturing efficiency. A mixed solvent being rich in a good solvent is preferable to increase solubility of cellulose ester. The preferable mixing ratios are 70-98% by weight of a good solvent, and 30-2% by weight of a poor solvent.

Herein, a good solvent is described as being capable of dissolving cellulose ester with a single use, and a poor solvent means a solvent which just swells cellulose ester but is incapable of dissolving cellulose ester alone. Sometimes, a solvent works as a good solvent of a cellulose ester, and sometimes as a poor solvent depending on the average acylation degree of the cellulose ester. For example, acetone is a good solvent for an acetate ester of cellulose (the amount of combined acetic acid is 55%), as well as for cellulose acetatepropionate, however, it is a poor solvent for a cellulose acetate (the amount of combined acetic acid is 60%).

The good solvent is not specifically limited. Examples of a good solvent for cellulose triacetate include: organic halides such as methylene chloride and dioxolane, and those for acetatepropionate include: methylene chloride, acetone and methyl acetate.

Examples of a poor solvent include: methanol, ethanol, n-butanol, cyclohexane acetone and cyclohexanone, however, the present invention is not specifically limited thereto.

In the process of preparing a dope, cellulose ester is dissolved using a common method. Dissolving cellulose ester at a temperature higher than the boiling point is possible when the heating is carried out under a higher pressure. Formation of a gel or an insoluble agglomerate (known as "Mamako" in Japanese which represents insoluble residue when powder is dissolved in a solvent) may be preferably avoided when the dissolving temperature is higher than the ambient pressure boiling point of the solvent, and simultaneously the temperature is in the range where the solvent does not boil under the applied higher pressure. The following dissolving method is also preferable, in which cellulose ester is swollen in a mixture of good and poor solvents followed by adding good solvents to dissolve the swollen cellulose ester.

Pressure may be applied by injecting an inert gas such as nitrogen or by increasing the vapor pressure of the solvents by heating. Heating is preferably carried out from the outside of the container. A jacket type heater is preferable because the temperature is easily controlled.

A higher dissolving temperature is preferable with respect to the solubility of the cellulose ester, however, too high a temperature may lower the productivity because the pressure also becomes very high resulting in reducing the productivity. The dissolving temperature is preferably 45-120° C., more preferably 60-110° C. and still more preferably 70-105° C. The pressure should be controlled not to allow boiling at the set temperature.

In the next process, the cellulose ester solution thus prepared is filtered using an appropriate filter material. A filter material with a smaller absolute filtration accuracy is more preferable for removing insoluble materials, however, too small a filtration accuracy easily cause clogging up of the filter. The absolute filtration accuracy of the filter is preferably not larger than 0.008 mm, more preferably 0.001-0.008 mm and still more preferably 0.003-0.006 mm.

The filter material used in the present invention is not specifically limited, and plastic filters (such as polypropylene and Teflon(R)) as well as metal filters (such as stainless steel) are preferable, since these materials are free from peeling of a fiber.

The dope may be filtered by any common method. One of these preferable filtering methods is to filter the dope at temperatures which are higher than the ambient pressure boiling point of mixed solvent, and simultaneously in the range where the solvent does not boil under a higher pressure. This method is preferable because the pressure difference between before and after filtering (also referred to as a filtering pressure) is reduced. The filtering temperature is preferably from 45 to 120° C., more preferably from 45 to 70° C. and still more preferably from 45 to 55° C. The filtering pressure is preferably small. The filtering pressure is preferably not more than 1.6 MPa, more preferably not more than 1.2 MPa and still more preferably not more than 1.0 MPa.

A stainless steel endless belt or a stainless steel drum, the surface of which are polished to a mirror finished surface, is preferably used in the casting process. The temperature of the metal support is preferably from 0° C. to a temperature less than the boiling point of the solvent. A higher temperature of the support is more preferable because the web is more quickly dried, however, too high a temperature may cause foaming or loss of flatness of the web. The temperature of the support is preferably 0-40° C., and it is more preferable to cast on the support of which temperature is 5-30° C. The method to control the temperature of the support is not specifically limited and a method of blowing warm or cool air onto the support or to contact a warm water tray to the support is applicable. The warm water method is more preferable because the temperature of the metal support becomes stable in a shorter time due to more efficient thermal conduction. In the case when warm air is used, the air temperature is needed to be higher than the desired temperature of the support.

In order to obtain a cellulose ester film with a sufficient flatness, the residual solvent content of the web when it is peeled from a metal support is preferably 10-120%; more preferably 20-40% or 60-120%; and specifically preferably 20-30% or 70-115%. The residual solvent content of the web is defined by the following equation:

Residual solvent content=((weight of film before heat treating−weight of film after heat treating)/(weight of film after heat treating))×100 (%)

wherein "heat treating" means that the film is heat treated at 115° C. for 1 hour.

In the drying process of a cellulose ester film, the film is peeled from the support and further dried until the residual solvent decreases below not more than 3%, and more preferably not more than 0.5%. In the film drying process, a drying method in which the film is passed through many rolls or by a tenter method.

It is preferable for improving the flatness of the film that the film is subjected to width keeping or stretching by a tenter system at the time just after peeling off from the support when the film contains plentiful amount of remaining solvent. Larger stretching ratio by the tenter caused larger hygroscopic elastic modulus in the traverse direction of the film. The stretching ratio is preferably from 0 to 40%, and more preferably from 1 to 35%. The stretching ratio of 0% means the width keeping, and the effect similar to that of the stretching can be obtained when the amount of remaining solvent is large.

The method for drying the film is not specifically limited and the drying can be usually carried out by hot air, infrared rays, a heating roller and microwaves, and hot air is preferably applied from the viewpoint of simplicity.

It is preferable that the drying temperature is raise stepwise within the range of from 40 to 150° C., and more preferably within the range of from 50 to 140° C. for improving the dimensional stability. The drying is preferably carried out for 10 to 40 minutes at a temperature of ±20° C. of the softening point of the film for raising the hygroscopic elastic modulus. The hygroscopic elastic modulus in the casting direction can be controlled by controlling the transporting tension in the course of the drying at a temperature of ±20° C. of the softening point of the film. Preferable range of the transporting tension is from 80 to 350 N/m, and more preferably from 150 to 300 N/m.

Though the thickness of the film is not specifically limited, for example, the film having a thickness of about from 10 μm to 1 mm may be produced. The thickness after the treatment such as drying and stretching is preferably from 10 to 500 μm, particularly from 30 to 120 μm.

The cellulose ester film of the present invention having a width of from 1 to 4 m is preferably used.

The effect of the present invention is considerably displayed in a large width cellulose ester film since the cellulose ester film excellent in the flatness can be obtained by the constitution of the present invention. The film having a width 1.4 to 4 m of width is preferred, and particularly one having a width of from 1.4 to 2 m is preferable. The film having a width of more than 4 m is difficultly transported.

An additive such as a UV absorbent, dye and matting agent may be added to the cellulose ester film of the present invention according to necessity. The UV absorbent is preferably used, which is superior in the absorption of UV rays of wavelength of not more than 370 nm for preventing the deterioration of the liquid crystal and having small absorption to visible rays of wavelength of not less than 400 nm for obtaining suitable displaying ability of liquid crystal display. In the present invention, the transparency at a wavelength of 370 nm is preferably not more than 10%, more preferably not more than 5%, and further preferably not more than 2%.

In the present invention, a UV absorbent having two or more aromatic ring in the molecule thereof is particularly preferred. Though the UV absorbent to be used is not specifically limited, for example, an oxybenzophenone type compound, a benzotriazole type compound, a salicylate type compound, a benzophenone type compound, a cycanoacrylate type compound, a nickel complex type compound and inorganic particles are usable. Benzotriazole type UV absorbents and benzophenone type UV absorbents are preferably used, which are superior in transparency and the ability for preventing deterioration of the polarizing plate and the liquid crystal element. The benzotriazole type UV absorbent causing less unnecessary coloring are particularly preferable. Concretely, Tinuvin 109, Tinuvin 171, Tinuvin 326, Tinuvin 327 and Tinuvin 328, each manufactured by Ciba Specialty Chemicals Inc., are preferably usable as the UV absorbent, but the UV absorbent is not limited thereto.

The UV absorbent may be used solely or in combination of two or more kinds thereof. A polymer UV absorbent preferably can be used, and a polymer type UV absorbents described in JP-A No. 6-148430 are preferably used.

The UV absorbent may be added to a dope in a state of solution prepared by dissolving in an organic solvent such as alcohol, methylene chloride and dioxoran or directly into the dope composition. The UV absorbent insoluble in the organic solvent such as inorganic particles is dispersed in an organic solvent solution of the cellulose ester by a dissolver or a sand mill and then added to the dope.

Though the using amount of the UV absorbent is varied depending on the kind of the compound and using conditions, an amount of from 0.5 to 4.0% by weight of the cellulose film is preferable and that of from 0.6 to 2.0% by weight is more preferable when the thickness of the dried film is 30 to 200 μm. In the present invention, a blue dye may be added for inhibiting the yellowish coloring of the film. An anthraquinone type dye is preferable. The anthraquinone dye may have an optional substituent at any position of 1 to 8. Examples of preferable substituent include an anilino group, a hydroxyl group, an amino group, a nitro group and a hydrogen atom. The adding amount of such the dyes is from 0.1 to 1,000 μg/m$^2$, and preferably from 10 to 100 μg/m$^2$.

Particles such as silicon oxide may be added as the matting agent to the film of the present invention. The inorganic particles are preferably treated on the surface by an organic compound for decreasing the haze of the film. As the organic compound preferably used for the surface treatment, a halocylane type compound, an alkoxysilane type compound, silazane and siloxane are usable. A large diameter of the particles are effective to the matting effect and a small diameter is superior in the transparency. Therefore, the average diameter of primary particles is preferably from 5 to 50 nm, and more preferably from 7 to 20 nm.

Though the particle of silicon oxide is not specifically limited, Aerosil 200, 200V, 300, R972, R972CF, R974, R202, R805, R812, OX50, TT600, each manufactured by Nihon Aerosil Co., Ltd., are usable, and Aerosil 200, 200V, R972, R972V, R974, R202, R805 and R182, are preferable.

The various additives may be added to the dope in a batch to the dope or by in-line addition of a separately prepared additive solution. When the additive solution is added by in-line, it is preferable that a small amount of cellulose ester is dissolved together with the additives for improving the mixing suitability of the additive solution with the dope. The preferable amount of the cellulose ester is from 1 to 10, and more preferably from 3 to 5, parts by weight to 100 parts by weight of the solvent.

For carrying out the in-line addition and mixing in the present invention, for example, a static mixer such as Static Mixer, manufactured by Toray Engineering Co., Ltd., and SWJ (Toray static in tube mixer Hi-Mixer) is preferably applicable.

(Retardation Film)

There is a problem of viewing angle such as that the displaying ability is lowered when the displayed image is viewed from a slanting direction even though the suitable displaying ability can be obtained when the image is viewed from the front direction since the liquid crystal and the polarizing plate are used each of which has anisotropism. Therefore, a viewing angle compensation plate is necessary for improving the displaying properties. The distribution of the refractive index in the cell is usually larger in the thickness direction and smaller in the plane direction. Accordingly, one having a negative single-axis structure is useful for the optical compensation plate, in which the refractive index in the thickness direction is smaller than that in the plane direction so as to cancel the anisotropy. The cellulose ester film of the present invention can be utilized as the retardation film having such the function.

In the present invention, a stretched cellulose ester film having a Ro value at 23° C. and 55% RH of from 20 to 300 nm and a Rt value at the same condition of from 70 to 400 nm is preferred for the retardation film. The values of Ro and Rt are defined by the following expressions.

$Ro=(nx-ny)\times d$ $Rt=\{(nx+ny)/2-nz\}\times d$

In the above expressions, nx, ny and nz are each the refractive indexes in the directions of the main axes x, y and z of a refractive index ellipse, respectively, and nx and ny are each refractive indexes in the in-plane direction and nz is the refractive index in the thickness direction, nx and ny satisfy nx≧ny, and d is the thickness (nm) of the film. The values of the Ro and Rt can be measured by an automatic double refractometer. For example, they can be measured by KOBRA-21ADH, manufactured by Ooji Keisokuki Co., Ltd., at a wavelength of 590 nm under the condition of 23° C. and 55% RH. Furthermore, it is preferable that the following expression is satisfied.

$2\leq Rt/Ro\leq 5$

An example of the stretching process (also referred to as the tenter process) of the present invention will now be explained using FIG. 2.

Figure 1:
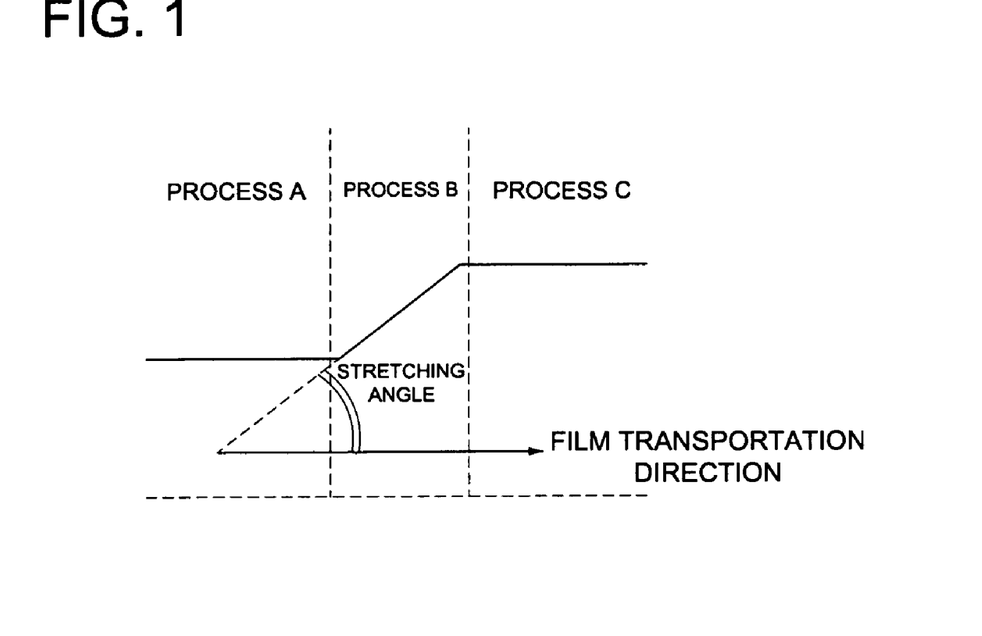
FIG. 1 illustrates the stretching angle in a stretching process.
Figure 2:
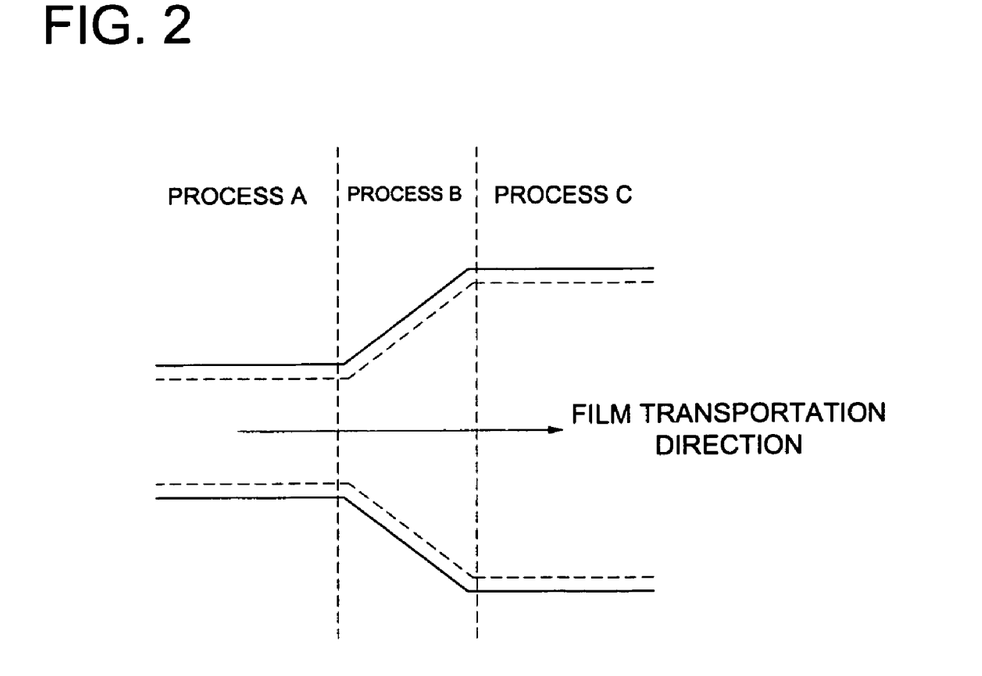
FIG. 2 is a schematic view showing one example of the tenter process employed in the present invention.

Process A of FIG. 2 is the process where a film conveyed from the peeling and transporting process (not illustrated, hereafter referred to as Process D0) is held by clipping both edges. In Process B, the film is stretched in the lateral direction (perpendicular to the film transportation direction) with the stretching angle illustrated in FIG. 1. In Process C, stretching is completed and the film is transported to the next production process while being clipped.

A slitter which trims both edges in the lateral direction of the film is preferably provided at any position between just after the film is peeled and just after Process B or C. Specifically preferably, a slitter is provided just before Process A. When a stretching is carried out under the same condition, a stretched film which is slit before Process B shows an improved orientation angle distribution of slow axes compared to a stretched film without slitting.

This may be because an undesirable stretching in the longitudinal direction is suppressed between the peeling process and Process B where the film still contains much solvent.

In the tenter process, a different temperature zone may be purposely provided in the film to improve the orientation angle distribution. Also a neutral zone is preferably provided between two different temperature zones to prevent interference.

The stretching process may be divided into several steps. Biaxial stretching in both casting direction and the lateral direction is also preferable. Biaxial stretching may be carried out simultaneously or in series of steps. In stepped stretching, stretching may be carried out alternately in different directions or stepwise in one direction. Stretching alternately in different directions may also be added to the sequence of stepped stretching in one direction. Namely, the following stretching steps are also employable.

Stretching in the casting direction—stretching in the lateral direction—stretching in the casting direction—stretching in the casting direction; and Stretching in the lateral direction—stretching in the lateral direction—stretching in the casting direction—stretching in the casting direction.

In the simultaneous biaxial stretching process, included is a process in which the film is stretched in one direction while the tension in the other direction is relaxed to allow the film shrinks in that direction. The stretching ratios of the film in a biaxial stretching are preferably as follows: x1.05-x1.5 in the lateral direction and x0.8-x1.3 in the longitudinal direction (casting direction); more preferably x1.1-x1.5 in the lateral direction and x0.8-x0.99 in the film longitudinal direction; and specifically preferably x1.1-x1.4 in the lateral direction and x0.9-x0.99 in the film longitudinal direction.

The term "stretching direction" used in the present invention usually represents the direction in which stretching tension is applied, however, when a film is biaxially stretched in a plurality of steps, the "stretching direction" may mean the direction in which the final stretching ratio of the film becomes larger (which is usually the slow axis direction). Specifically, in the description concerning the dimensional variation ratio, the expression: "stretching direction" is mainly used as the latter meaning. The amount of residual solvent is expressed by the above equation.

In order to improve the dimensional stability under a condition of 80° C. and 90% RH of the cellulose ester film being subjected to the stretching treatment, the stretching treatment is preferably carried out at a higher temperature.

It is well known that, when a film is stretched in the lateral direction of the film, the dispersion of orientations of slow axes (hereafter referred to as an orientation angle dispersion) becomes larger. In order to conduct stretching in the lateral direction of a film while the ratio of Rt to Ro is kept constant and the orientation angle dispersion is kept small, there exists relationships among film temperatures of processes A, B and C, namely, the following relationships are preferably satisfied: $Ta \leq (Tb-10)$, or $Tc \leq Tb$, and more preferably the both relationships are simultaneously satisfied: $Ta \leq (Tb-10)$ and $Tc \leq Tb$, wherein Ta, Tb and Tc represents temperatures in Celsius at each end of Processes A, B and C, respectively.

In order to decrease the above mentioned orientation angle dispersion, the temperature increasing rate of the film in Process B is preferably 0.5-10° C./s.

In order to reduce the dimensional variation under a condition of 80° C. and 90% RH, the stretching duration in Process B is preferably shorter, however, a lower limitation of the stretching duration may be prescribed to maintain uniformity of the film. Specifically, the stretching duration is preferably 1 to 10 seconds and more preferably 4-10 seconds. The temperature of Process B is preferably 40-180° C., and more preferably 100-160° C.

In the tenter process, the coefficient of heat transfer may be constant or may be changed. The heat transfer coefficient is preferably in the range of $41.9\text{-}419 \times 10^3$ J/m²hr, more preferably $41.9\text{-}209.5 \times 10^3$ J/m²hr, and further more preferably $41.9\text{-}126 \times 10^3$ J/m²hr.

The stretching rate in the lateral direction in Process B may be constant or may be changed. The stretching rate is preferably in the range of 50-500%/minute, more preferably 100-400%/minute, and most preferably 200-300%/minute.

In the tenter process, the distribution of environmental temperature in the lateral direction of the film is preferably smaller to improve uniformity of a film. The distribution of environmental temperature in the lateral direction in the tenter process is preferably within ±5° C., more preferably within ±2° C., and most preferably within ±1° C. By decreasing the distribution of environmental temperature, the temperature distribution in the lateral direction of a film may also be decreased.

In Process C, the width of a film is preferably relaxed. Specifically, the width is preferably adjusted to 95 to 99.5% of the width in the former process.

After a film is treated in the tenter process, a subsequent-drying process (hereafter referred to as Process D1) is preferably provided. The film is preferably subjected to a heat treatment in the temperature range of 50 to 140° C., more preferably, 80 to 140° C., and most preferably 110 to 130° C.

In Process D1, the distribution of environmental temperature in the lateral direction of the film is preferably smaller to improve uniformity of the film. The distribution of environmental temperature in the lateral direction is preferably within ±5° C., more preferably within ±2° C., and most preferably within ±1° C.

Although the tension applied to the film while the film is being transported is affected by, for example, the property of a dope, the amounts of residual solvent at the peeling process and Process D0, and the temperature of Process D1, the film tension is preferably 80-200 N/m, more preferably 140-200 N/m, and most preferably 140-160 N/m.

In order to reduce further stretching in the film transportation direction of the film in Process D1, a tension cut roll is preferably provided. After the drying is completed, the edge of the film is preferably trimmed by a slitter provided before a winding roll, in order to obtain an excellent roll shape.

With respect to the polarization plate of the present invention, the retardation value of the cellulose film is preferably controlled by stretching the cellulose ester film in the lateral direction of the film, in order to obtain an improved display property.

In order to attain an object of the present invention, the retardation film of the present invention is preferably produced by a film production method via casting and preferably has a thickness of 30 μm to 150 μm. Such a retardation film is suitable with respect to the physical strength and the productivity of the film as well as obtaining the effect of the present invention. The thickness of the film is more preferably 40 μm to 120 μm.

Further, the elastic modulus in the lateral direction is preferably larger than the elastic modulus in the casting direction of the cellulose ester film of the present invention, more preferably the elastic modulus in the lateral direction is 1.0 to 1.5 times larger than the elastic modulus in the casting direction. Since the elastic modulus of the cellulose ester film can be controlled by the extent of stretching, the ratio of elastic moduli in the lateral direction and in the casting direction is controllable by adjusting the stretching ratios in the lateral direction and in the casting direction.

(Polarizing Plate)

The polarizing plate of the present invention will now be described.

It is possible to prepare the polarizing plates employing common methods. It is preferable that the back surface of the cellulose ester film of the present invention is subjected to an alkali saponification treatment and the resulting cellulose ester film is adhered, employing an aqueous solution of completely-saponified polyvinyl alcohol, to at least one surface of a polarizing film (polarizer) which has been prepared by being immersed into an iodine solution and subsequently being stretched. Another cellulose ester film of the present invention may also be used for the reverse surface of the polarizing film or other polarizing plate protective film may also be used for the reverse surface. Preferable is to use the above mentioned retardation film on the other surface of the polarizing film reverse to the cellulose film of the present invention. Or also preferable is to use a polarizing plate protective film having a function of a retardation film which has an optical anisotropic layer formed by orienting a liquid crystal compound such as discotic liquid crystal, rod-shaped liquid crystal, or cholesteric liquid crystal. It is possible to form an optical anisotropic layer employing the method disclosed in JP-A No. 2003-98348. By employing the polarizing plate protective film in combination with the cellulose ester film of the present invention, it is possible to obtain a polarizing plate exhibiting excellent flatness and a stable viewing angle enlarging effect.

On the surface of the polarizing film reverse to the surface where the cellulose ester of the present invention is provided, another polarizing plate protective film having a thickness of 40-120 μm is preferably employed. Examples of such a film commercially available include Konica Minolta Tac: KC8UX2M, KC4UX, KC5UX, KC4UY, KC8UY, KC12UR, KC8UCR-3, KC8UCR-4, KC8UCR-5 and KC8UX-RHA (all produced by Konica Minolta Opto, Inc.).

The polarizing film which is a major constituting component of polarizing plates, as described herein, refers to the element which only transmits the light of a polarized wave in the definite direction. One of the typical polarizing film, which is presently known, is a polyvinyl alcohol based polarizing film which is classified into two types, namely, one prepared by dying polyvinyl alcohol based film with iodine and the other prepared by dying the polyvinyl alcohol based film with a dichroic dye. The polarizing film is prepared in such a manner that an aqueous polyvinyl alcohol solution is cast and the resulting cast film is subjected to uniaxial stretching and dying, or is subjected to dying and uniaxial stretching, and subsequently is preferably subjected to a durability treatment employing boron compounds. One surface of the cellulose ester film of the present invention is adhered to the surface of the above polarizing film, whereby a polarizing plate is formed. Adhesion is performed employing preferably water based adhesives containing completely-saponified polyvinyl alcohol as a major component.

A polarizing film is subjected to uniaxial orientation (commonly in the longitudinal direction). When a polarizing plate is allowed to stand at high temperature and high humidity, the length in the stretching direction (commonly the longitudinal direction) decreases, while the length in the perpendicular direction (commonly the width direction) increases. As the thickness of a polarizing plate protective film decreases, shrinkage ratio increases, specifically, shrinkage ratio in the longitudinal direction increases. Generally, a polarizing film is adhered to a polarizing plate protective film so that the stretching direction of the polarizing film lies in the casting direction (also referred to as the MD direction) of the polarizing plate protective film. Consequently, it is important that when the thickness of the polarizing plate protective film is decreased, elongation and shrinkage ratio in the casting direction of the polarizing film is preferably decreased. The cellulose ester film of the present invention is suitably applied to such a polarizing plate protective film due to its excellent dimensional stability.

Namely, in a durability test of the cellulose ester film of the present invention under the condition of 60° C., 90% RH, wavy unevenness of the film does not appear. Also a polarizing plate having a retardation film on the rear surface exhibits an unchanged viewing angle even after the durability test resulting in providing an excellent visibility.

<Display>

By using the polarizing plate of the present invention, a variety of displays of the present invention excellent in visibility are provided. The cellulose ester film of the present invention is usable for the liquid crystal displays of various types, for example, a reflection type, a transmission type or a transflective type, or of various drive modes, such as STN, TN, OCB, HAN, VA (PVA, MVA), and IPS. The cellulose ester film of the present invention exhibits excellent flatness and preferably employed for such as plasma displays, field emission displays, organic EL displays, inorganic EL displays and electronic papers. Specifically, when used for a large screen display of 30 inches or more, effects for reducing color unevenness, wavy surface and eye fatigue after a long observation were obtained.

EXAMPLES

The present invention is described below referring examples, but the present invention is not limited to the examples.

Example 1

<<Preparation of Cellulose Ester Film 101>>

Cellulose esters, plasticizers, UV absorbents and particle to be used in the examples are listed in Table 1. In the table, the ester compound having an aromatic group at the terminal thereof (aromatic terminal ester) and the polyvalent alcohol ester are described as the plasticizer.

TABLE 1

| Resin CELLULOSE ESTER | SUBSTITUTION DEGREE | Mn | Mw/Mn |
|---|---|---|---|
| A | ACETYL GROUP: 2.0 PROPIONYL GROUP: 0.7 | 70000 | 2.4 |
| B | ACETYL GROUP: 1.7 PROPIONYL GROUP: 0.9 | 54000 | 2.9 |
| C | ACETYL GROUP: 1.65 PROPIONYL GROUP: 0.9 | 55000 | 2.7 |
| D | ACETYL GROUP: 1.6 PROPIONYL GROUP: 0.9 | 40000 | 2.5 |
| E | ACETYL GROUP: 1.45 PROPIONYL GROUP: 1.1 | 53000 | 2.4 |
| F | ACETYL GROUP: 2.4 | 50000 | 2.4 |
| G | ACETYL GROUP: 1.5 PROPIONYL GROUP: 0.9 | 55000 | 2.4 |
| Plasticizer | | | |
| A | Triphenyl phosphate | | |
| B | Ethylphthalylethyl glycolate | | |
| C | Aromatic terminal ester sample No. 1 | | |
| D | trimethylolpropane tribenzoate | | |
| E | Aromatic terminal ester sample No. 3 | | |
| F | Aromatic terminal ester sample No. 13 | | |
| UV absorbent | | | |
| A | Tinuvin 326 (Ciba Specialty Chemicals Inc.) | | |
| B | Tinuvin 109 (Ciba Specialty Chemicals Inc.) | | |
| C | Tinuvin 171 (Ciba Specialty Chemicals Inc.) | | |
| D | UV absorbent 1 | | |
| Particle | | | |
| Particle | Aerosil R972V (Nihon Aerosil Co., Ltd.) | | |

UV absorbent 1

Mn = Approximately 5,000
Mw = Approximately 10,000

(Particle Dispersion)

| Particle | 11 parts by weight |
|---|---|
| Ethanol | 89 parts by weight |

The above composition was mixed by stirring for 50 minutes and dispersed by Manton-Goulin dispersing machine.

(Particle Adding Liquid)

Cellulose B was added to a dissolving tank containing methylene chloride and completely dissolved by heating, and then filtered by Azumi Filter Paper No. 244, manufactured by Azumi Roshi Co., Ltd. The particle dispersion was slowly added to the filtered cellulose ester solution while sufficiently stirring, and further dispersed by an attriter so that the diameter of the secondary particle become to designated size. The resultant liquid was filtered by Finemet NF, manufactured by Nihon Seisen Co., Ltd., and a particle adding liquid having the following composition was prepared.

| | |
|---|---|
| Methylene chloride | 99 parts by weight |
| Cellulose ester B | 4 parts by weight |
| Particle dispersion | 11 parts by weight |

A main dope having the following composition was prepared. Methylene chloride and ethanol were put into a pressure dissolving tank. Cellulose ester B was put into the pressure tank containing the solvents while stirring. The contents of the tank were completely dissolved by heating and stirring and the plasticizer and the UV absorbent were added and dissolved. The resultant solution was filtered by Azumi Filter Paper No. 244, manufactured by Azumi Roshi Co., Ltd., to prepare the main dope.

The particle adding liquid was added to the main dope so that the ratio of the dope to the particle adding liquid was made to 100 parts by weight to 2 parts by weight and sufficiently mixed by an in-line mixer (Toray static type in-tube mixer Hi-Mixer SWJ). The resultant dope was uniformly cast on a 2 meter-width stainless steel band support by a belt type casting apparatus. The cast dope is dried on the stainless band support until the remaining solvent amount become 110% and peeled off from the stainless band support. The web was stretched by 1.02 times in the casting direction MD by applying force on the occasion of the peeling. After that, the web was held by the tenters at the both side portions and stretched by 1.3 times in the traverse direction TD. The remaining solvent content at beginning of the stretching was 30%. After the stretching, the web was leaved for several seconds while holding the width and the width holding was released after easing of the tension in the traverse direction. And then the web was dried by conveyed for 30 minutes in the third drying zone held at 125° C. Thus Cellulose Ester Film 101 of the present invention was prepared which has a width of 1.5 m and knurling of 1 cm width and 8 μm height at both edge portions.

(Composition of Main Dope)

| | |
|---|---|
| Methylene chloride | 300 parts by weight |
| Ethanol | 57 parts by weight |
| Cellulose ester B | 100 parts by weight |
| Plasticizer C | 5.5 parts by weight |
| Plasticizer D | 5.5 parts by weight |
| UV absorbent A | 0.4 parts by weight |
| UV absorbent B | 0.7 parts by weight |
| UV absorbent C | 0.6 parts by weight |

Cellulose Ester Films 102 through 110 of the present invention and Cellulose Ester Films 201 and 202 for comparing were prepared in the same manner as above except that the resin, plasticizer, UV absorbent, drying temperature, and the stretching ratio in the traverse direction were changed as listed in Tables 2 and 3.

TABLE 2

| *1 | Main dope | *3 | Main dope composition ||||||| *4 | *5 | Casting Drying temperature | Remarks |
|---|---|---|---|---|---|---|---|---|---|---|---|---|
| | | | Resin | Plasticizer || UV absorbent ||| | | | |
| 101 | 100 | 2 | B(100 kg) | C(5.5 kg) | D(5.5 kg) | A(0.4 kg) | B(0.7 kg) | C(0.6 kg) | 300 kg | 57 kg | 120° C. | Inv. |
| 102 | 100 | 2 | C(100 kg) | C(5.5 kg) | D(5.5 kg) | A(0.4 kg) | B(0.7 kg) | C(0.6 kg) | 300 kg | 57 kg | 120° C. | Inv. |
| 103 | 100 | 2 | A(100 kg) | C(5.5 kg) | D(5.5 kg) | D(3.0 kg) | — | — | 300 kg | 57 kg | 125° C. | Inv. |
| 104 | 100 | 2 | B(100 kg) | D(5.5 kg) | E(5.5 kg) | D(3.0 kg) | — | — | 300 kg | 57 kg | 125° C. | Inv. |
| 105 | 100 | 2 | D(100 kg) | D(5.5 kg) | E(5.5 kg) | D(3.0 kg) | — | — | 300 kg | 57 kg | 125° C. | Inv. |
| 106 | 100 | 2 | F(100 kg) | D(5.5 kg) | E(5.5 kg) | D(0.4 kg) | — | — | 300 kg | 57 kg | 125° C. | Inv. |
| 107 | 100 | 2 | E(100 kg) | C(5.5 kg) | D(5.5 kg) | D(3.0 kg) | — | — | 300 kg | 57 kg | 125° C. | Inv. |
| 108 | 100 | 2 | E(100 kg) | D(5.5 kg) | E(5.5 kg) | A(0.4 kg) | B(0.7 kg) | C(0.6 kg) | 300 kg | 57 kg | 125° C. | Inv. |
| 109 | 100 | 2 | G(100 kg) | C(5.5 kg) | D(5.5 kg) | D(3.0 kg) | — | — | 300 kg | 57 kg | 125° C. | Inv. |
| 110 | 100 | 2 | C(100 kg) | F(5.5 kg) | D(5.5 kg) | D(3.0 kg) | — | — | 300 kg | 57 kg | 125° C. | Inv. |
| 201 | 100 | 2 | A(100 kg) | A(9.5 kg) | B(2.2 kg) | A(0.4 kg) | B(0.7 kg) | C(0.6 kg) | 300 kg | 57 kg | 100° C. | Comp. |
| 202 | 100 | 2 | C(100 kg) | A(9.5 kg) | B(2.2 kg) | A(0.4 kg) | B(0.7 kg) | C(0.6 kg) | 300 kg | 57 kg | 100° C. | Comp. |

*1 Cellulose ester film No.,
*2 Mixing ratio of main dope to particle adding liquid,
*3 Particle adding liquid,
*4 Methylene chloride,
*5 Ethanol
Inv. Inventive,
Comp. Comparative

TABLE 3

| *1 | Rt value (23° C.) Rt (b) | Rt (c) | *2 Rt (a) | Ro value (23° C.) | Hygroscopic expansion coefficient 1/% RH MD | TD | Stretching (times) | Thickness (μm) | Remarks |
|---|---|---|---|---|---|---|---|---|---|
| 101 | 130 | 122 | 8  | 39 | $3.00 \times 10^{-5}$ | $2.80 \times 10^{-5}$ | 1.3  | 40 | Inv. |
| 102 | 130 | 119 | 11 | 41 | $2.95 \times 10^{-5}$ | $2.75 \times 10^{-5}$ | 1.25 | 40 | Inv. |
| 103 | 132 | 119 | 13 | 39 | $3.00 \times 10^{-5}$ | $2.80 \times 10^{-5}$ | 1.2  | 80 | Inv. |
| 104 | 130 | 123 | 7  | 40 | $3.05 \times 10^{-5}$ | $2.76 \times 10^{-5}$ | 1.3  | 40 | Inv. |
| 105 | 131 | 122 | 9  | 39 | $2.54 \times 10^{-5}$ | $2.35 \times 10^{-5}$ | 1.25 | 40 | Inv. |
| 106 | 132 | 120 | 12 | 39 | $2.95 \times 10^{-5}$ | $2.75 \times 10^{-5}$ | 1.2  | 40 | Inv. |
| 107 | 130 | 121 | 9  | 39 | $2.84 \times 10^{-5}$ | $2.57 \times 10^{-5}$ | 1.25 | 40 | Inv. |
| 108 | 131 | 122 | 9  | 41 | $2.90 \times 10^{-5}$ | $2.68 \times 10^{-5}$ | 1.25 | 40 | Inv. |
| 109 | 135 | 125 | 10 | 43 | $2.90 \times 10^{-5}$ | $2.68 \times 10^{-5}$ | 1.2  | 40 | Inv. |
| 110 | 131 | 122 | 9  | 41 | $2.91 \times 10^{-5}$ | $2.68 \times 10^{-5}$ | 1.25 | 40 | Inv. |
| 201 | 142 | 118 | 24 | 41 | $4.10 \times 10^{-5}$ | $3.71 \times 10^{-5}$ | 1.3  | 80 | Comp. |
| 202 | 140 | 121 | 19 | 39 | $4.05 \times 10^{-5}$ | $3.68 \times 10^{-5}$ | 1.25 | 40 | Comp. |

*1 Cellulose ester film No.,
*2 Hygroscopic variation of Rt
Inv. Inventive,
Comp. Comparative Each of the samples was subjected to measurement of the hygroscopic expansion coefficient in the casting direction MD and the traverse direction TD of the film, and the hygroscopic variation of the retardation value was determined according to the following manner.

(Hygroscopic Expansion Coefficient)

The hygroscopic expansion coefficient (1/RH in percent) was expressed by the following expression. In the following, $L_4$ is the length (mm) of the film at a certain relative humidity $RH_4$ (--% RH in this example) at 23° C., $L_0$ is the original length (mm) of the film at the standard condition (23° C., 55% RH), $RH_0$ is the standard relative humidity (% RH), and $RH_4$ is the varied relative humidity (% RH).

$$\beta = \{(L_4-L_0)/L_0\}/(RH_4-RH_0)$$

The hygroscopic expansion coefficient is the dimensional variation per 1% of relative humidity and displays the degree of the dimensional variation of the film depending on the relative humidity. In the present invention, the hygroscopic expansion coefficient is preferably not more than $6 \times 10^{-5}$, more preferably not more than $3 \times 10^{-5}$, and further preferably not more than $1 \times 10^{-5}$, in 1/HR percent.

(Hygroscopic Variation of Retardation Value)

The retardation value of each of thus prepared cellulose ester films was measured at each of various temperatures and a value of Rt(a) was determined from the measurement results.

The Rt(a) value was determined according to the following expression, in which Rt(b) was the retardation measured after conditioning the film at 23° C. and 55% RH for 5 or more hours and under the same conditions and Rt(c) was the retardation value of the same film measured at 23° C. and 80% RH after conditioning for 5 or more hours under the same condition.

$$Rt(a) = |Rt(b) - Rt(c)|$$

After that the sample was conditioned and measured once more at 23° C. and 55% RH for confirming that the variation was reversible.

The evaluation results of the cellulose ester films prepared in Example 1 were listed in Table 3.

The hygroscopic expansion coefficient of each of the cellulose films 101 to 110 of the present invention is smaller than that of the comparative films. Consequently, it is understood that the films of the present invention are small in the dimensional variation relating to the temperature and moisture and the variation in the retardation value Rt and superior as the polarizing plate protection film. The films prepared in the same manner as in Cellulose Ester Film 101 except that Plasticizer C was replaced by the aromatic terminal ester sample No. 2 or 4 through 12 exhibited excellent results as the polarizing plate protection film the same as Cellulose Ester Film 101.

Example 2

<<Preparation of Polarizing Plate>>

Poly(vinyl alcohol) film of 120 μm was stretched by 5 times at 110° C. by single-axis expansion. The stretched film was immersed for 60 seconds into an aqueous solution composed of 0.075 g of iodine, 5 g of potassium iodide and 100 g of water and then immersed in an aqueous solution of 68° C. composed of 6 g of potassium iodide, 7.5 g of boric acid and 100 g of water and washed and dried to obtain a polarizing layer.

Then the polarizing layer was pasted with each of Cellulose Ester Films 101 through 110, 201 and 202. The backside of the polarizing layer was pasted with the following cellulose ester film as the polarizing plate protecting film to prepare polarizing plates according to the following processes 1 through 5.

Process 1: The cellulose ester film was immersed into a 2 moles/liter sodium hydroxide solution for 90 seconds and washed and dried to prepare the cellulose ester film saponified on the surface to be pasted with the polarizing element.

Process 2: The foregoing polarizing layer is immersed for 1 to 2 seconds into a tank containing a polyvinyl alcohol solution having a solid content of 2% by weight.

Process 3: The polarizing layer treated in Process 2 was placed, after lightly wiping the excessively adhering the adhesive on the cellulose acetate film treated in Process 1.

Process 4: Each of Cellulose Ester Film 101 through 110, 201 and 202, the polarizing layer and a backside cellulose film piled in Process 3 were pasted applying a pressure of from 20 to 30 N/cm² in a rate of about 2 m/minute.

Process 5: The samples prepared by pasting each of Cellulose Ester Film 101 through 110, 201 and 202, the polarizing layer and the backside cellulose film in Process 4 were dried for 2 minutes to prepare Polarizing Plates 101 through 110, 201 and 202.

(Preparation of Backside Cellulose Ester Film)
<Particle Dispersion>

| Particle | 11 parts by weight |
|---|---|
| Ethanol | 89 parts by weight |

The above composition was mixed by a dissolver for 50 minutes and dispersed by Manton-Gaulin dispersing machine.

(Particle Adding Liquid)

Cellulose B was added to a dissolving tank containing methylene chloride and completely dissolved by heating, and then filtered by Azumi Filter Paper No. 244, manufactured by Azumi Roshi Co., Ltd. The particle dispersion was slowly added to the filtered cellulose ester solution while sufficiently stirring, and further dispersed by a attriter so that the diameter of the secondary particle become to designated size. The resultant liquid was filtered by Finemet NF, manufactured by Nihon Seisen Co., Ltd., and a particle adding liquid having the following composition was prepared.

| Methylene chloride | 99 parts by weight |
|---|---|
| Cellulose ester B | 4 parts by weight |
| Particle dispersion | 11 parts by weight |

A main dope having the following composition was prepared. Methylene chloride and ethanol were put into a pressure dissolving tank. Cellulose ester (acetyl group substituting degree: 2.9, Mn: 80,000 and Mw/Mn: 2.4) was put into the tank containing the solvents while stirring and completely dissolved, and the plasticizer and the UV absorbent were further added and dissolved. The resultant solution was filtered by Azumi Filter Paper No. 244, manufactured by Azumi Roshi Co., Ltd., to prepare a main dope.

The particle adding liquid was added to the main dope so that the ratio of the dope to the particle adding liquid was made to 100 parts by weight to 5 parts by weight and sufficiently mixed by an in-line mixer (Toray static type in-tube mixer Hi-Mixer SWJ). The resultant dope was uniformly cast on a 2 meter-width stainless steel band support of a belt type casting apparatus. The cast dope is dried on the stainless band support until the remaining solvent amount become 110% and peeled off from the stainless band support. The web was stretched by 1.1 times in the casting direction MD by applying force on the occasion of the peeling. After that, the web was held by the tenters at the both side portions and stretched by 1.1 times in the traverse direction TD. After the stretching, the web was leaved for several seconds while holding the width and the width holding was released after easing of the tension in the traverse direction. And then the web was dried by conveying for 30 minutes in the third drying zone held at 125° C. Thus a cellulose ester film was prepared which has a width of 1.5 m and knurling of 1 cm width and 8 μm height at both edge portions.

(Composition of Main Dope)

| Methylene chloride | 450 parts by weight |
|---|---|
| Ethanol | 30 parts by weight |

-continued

| Cellulose ester (acetyl group substituted degree: 2.9, Mn: 80,000, Mw/Mn: 2.4) | 100 parts by weight |
|---|---|
| Plasticizer C | 2.2 parts by weight |
| Plasticizer D | 9.5 parts by weight |
| UV absorbent A | 0.4 parts by weight |
| UV absorbent B | 0.7 parts by weight |
| UV absorbent C | 0.6 parts by weight |

The variation of light leaking and reworking ability of each of the polarizing plates was measured. Measured results are listed in Table 4.

(Variation of Light Leaking (Durability))

Two pieces of the polarizing plate were arranged in crossed nicols state and the transparency at a wavelength of 590 nm of them $T_1$ was measured by a spectral photometer U3100, manufactured by Hitachi Seisakusho Co., Ltd. After that, the two pieces of the polarizing plate were stood at 80° C. for 500 hours and the transparency $T_2$ of them arranged in the crossed nicols state was measured in the same manner as in the above for determining the variation caused by the thermal treatment, and the variation of light leaking was determined by the following expression.

Variation of Light leaking=$T_2(\%)-T_1(\%)$

The variation of light leaking of from 0 to 50% does not cause any problem in practical use, and is preferably from 0 to 4%, more preferably from 0 to 3%, and particularly preferably from 0 to 1%.

(Reworking Ability (Yield of Polarizing Plate))

The polarizing plate was cut into a square of 20 cm×20 cm and pasted with a glass plate by an acryl adhesive, and then the pasted polarizing plate was peeled off from the glass plate from a corner of the polarizing plate applying force of 5N. Such the operation was carried out for 100 pieces of every kind the polarizing plate, and the number of the polarizing plate which rent so as could not be completely peed off from the glass plate was counted. The reworking ability was ranked according to the following norms.

A: 0 to 5 pieces
B: 6 to 10 pieces
C: 11 to 15 pieces
D: 16 or more pieces

The reworking ability of level of A to D does not cause any problem in practical use, and is preferably not lower than b, and particularly preferably on level A.

TABLE 4

| | | | Liquid crystal display | | |
|---|---|---|---|---|---|
| Polarizing plate | Light leaking | Yield of polarizing plate | Degradation of viewing angle | Visibility | Remarks |
| Polarizing Plate 101 | 1.5 | A | A | B | Inv. |
| Polarizing plate 102 | 1.5 | A | A | B | Inv. |
| Polarizing plate 103 | 1.7 | A | A | B | Inv. |
| Polarizing plate104 | 0.9 | A | A | B | Inv. |
| Polarizing plate105 | 1.1 | A | A | B | Inv. |
| Polarizing plate106 | 1.5 | A | A | B | Inv. |
| Polarizing plate107 | 1.8 | A | A | B | Inv. |

TABLE 4-continued

| Polarizing plate | Light leaking | Yield of polarizing plate | Degradation of viewing angle | Visibility | Remarks |
|---|---|---|---|---|---|
| Polarizing plate108 | 1.2 | A | A | A | Inv. |
| Polarizing plate109 | 1.2 | A | A | B | Inv. |
| Polarizing plate110 | 1.1 | A | A | B | Inv. |
| Polarizing plate201 | 3.5 | B | C | C | Comp. |
| Polarizing plate202 | 3.9 | C | B | C | Comp. |

Inv. Inventive,
Comp. Comparative

It is clear from the above table that Polarizing Plates 101 through 110 according to the present invention are each excellent in the reworking ability and the light leaking. The polarizing plates prepared in the same manner as in Polarizing Plate 101 except that the cellulose ester films in which Plasticizer C used in Cellulose Ester Film 101 was replaced by the aromatic terminal ester sample No. 2 or 4 through 12 were used, displayed excellent results as the polarizing plate the same as Polarizing Plate 101.

Example 3

<<Preparation of Liquid Crystal Display>>

Liquid crystal panels for measuring the viewing angle were prepared as follows, and properties as crystal display of them were evaluated.

Polarizing plates previously pasted on both sides of 20-type display KLV-20AP2, manufactured by Sony Co., Ltd., was peeled and the above prepared Polarizing Plates 101 to 110, 201 and 202 were each pasted on the glass surface of the display.

The polarizing plate is pasted so that the surface Cellulose Ester Film 101 to 110, 201 or 202 was faced to the liquid crystal cell and the absorption axis thereof was agreed with the direction of that of the previously pasted polarizing plate to prepare Liquid Crystal Displays 101 to 110, 201 and 202, respectively. The polarizing plate was taken from an end portion of the bulk roll of the cellulose ester film, where the properties tend to be fluctuated.

(Deterioration of Viewing Angle)

The viewing angle of each of the above prepared liquid crystal displays (the panel available on the market+the prepared ellipse polarizing plate) was measured by EZ-Contrast 160D, manufactured by ELDIM Co. Ltd., under a condition of 23° C. and 55% RH. Moreover, the measurement was carried out under a condition of 23° C. and 20% RH, and a condition of 23° C. and 80% RH, and the results of the measurement were evaluated according to the following norms. The measurement at 23° C. and 55% RH was finally repeated for confirming that the variation in the above measurements was reversible. The measurements were each carried out after standing the liquid crystal display under the measuring condition for 5 hours.

A: The viewing angle is not varied at all.
B: The viewing angle was varied a little.
C: The viewing angle was varied considerably.

(Evaluation of Visibility)

Each of the above-prepared liquid crystal displays was stood for 100 hours under a condition of 60° C. and 90% RH and then restored to the condition of 23° C. and 55% RH, and the state of the surface was observed. The displays each using the polarizing plate of the present invention are excellent in the surface flatness. Contrary to that, small wavy unevenness was observed on the surface of the comparative displayers and eyes tend to be tired by watching for a long time.

A: Wavy unevenness was not observed on the surface.
B: Wavy unevenness was slightly observed on the surface.
C: Wavy unevenness was observed a little on the surface.
D: Wavy unevenness was clearly observed on the surface.

Evaluation results of Liquid Crystal Displays 101 to 110, 201 and 202 are listed in Table 4. It is confirmed from the results that Crystal Liquid Displays 101 to 110 according to the present invention is excellent in the deterioration of viewing angle and the visibility. The liquid crystal displays prepared in the same manner as in Liquid Crystal Display 101 except that the cellulose ester films in which Plasticizer C used in Cellulose Ester Film 101 was replaced by the aromatic terminal ester sample No. 2 or 4 through 12 were used, gave excellent results as the liquid crystal display the same as Liquid Crystal Display 101.

PROBABILITY OF INDUSTRIAL APPLICATION

A cellulose ester film improved in the reversible variation of the retardation value depending on the humidity variation, and a polarizing plate and a liquid crystal display excellent in the light leaking, viewing angle property and visibility in which the cellulose ester film is used can be provided by the present invention.

What is claimed is:

1. A polarizing plate having a cellulose ester film provided on one surface of a polarizer, wherein the cellulose ester film comprising a compound represented by Formula (1)

$$B\text{-}(G\text{-}A)_n\text{-}G\text{-}B \qquad \text{Formula (1)}$$

wherein B represents a benzene monocarboxylic acid residue; C represents an alkylene glycol residue having 2-12 carbon atoms, an aryl glycol residue having 6-12 carbon atoms, or an oxyalkylene glycol residue having 4-12 carbon atoms; A represents an alkylene dicarboxylic acid residue having 4-12 carbon atoms or an aryldicarboxylic acid residue having 6-12 carbon atoms; and n represents an integer of 1 or more, and the cellulose ester film has a stretching ratios from 1.05 to 1.5 in the lateral direction and from 0.8 to 1.3 in the longitudinal direction.

2. The polarizing plate of claim 1, wherein a number average molecular weight of the compound represented by Formula (1) is 300-2000.

3. The polarizing plate of claim 1, wherein an acid value of the compound represented by Formula (1) in the cellulose ester film is 0.5 mg KOH/g or less and a hydroxyl value of the compound represented by Formula (1) is 25 mg KOH/g or less.

4. The polarizing plate of claim 1, wherein a content of the compound represented by Formula (1) in the cellulose ester film is 3-11% by weight based on the weight of the cellulose ester film.

5. The polarizing plate of claim 1, wherein the cellulose ester film further comprises a polyalcohol ester.

6. The polarizing plate of claim 1, wherein the cellulose ester film simultaneously satisfies the following formulae (I) and (II):

$$2.1 \leq X+Y \leq 2.9 \qquad (I)$$

$$1.0 \leq X \leq 2.9 \qquad (II)$$

wherein X represents an acetyl substitution degree and Y represents a fatty acid ester group substitution degree.

7. The polarizing plate of claim 1, wherein the cellulose ester film has a width of 1.4-4 m.

8. The polarizing plate of claim 1, wherein Ro of the cellulose ester film represented by the following equation is 20-300 nm under a condition of 23° C. and 55% RH, and Rt of the cellulose ester film represented by the following equation is 70-400 nm under the condition of 23° C. and 55% RH:

$$Ro=(nx-ny) \times d$$

$$Rt=((nx+ny)/2-nz) \times d$$

wherein nx, ny and nz represent refractive indexes in x, y, and z directions, respectively, x, y, and z representing three principal axes of a refractive index ellipsoid; nx and ny each represent an inplane refractive index, while $nx \leqq ny$; nz represents a refractive index in a thickness direction; and d represents a thickness (nm) of the cellulose ester film.

9. The polarizing plate of claim 1, wherein the cellulose ester film is provided on one surface of the polarizer as a polarizing plate protective film.

10. The polarizing plate of claim 1, wherein the cellulose ester film is provided on one surface of the polarizer as a retardation film.

11. A liquid crystal display employing the polarizing plate of claim 1.

* * * * *